(12) United States Patent
Rosero

(10) Patent No.: US 9,429,092 B2
(45) Date of Patent: Aug. 30, 2016

(54) FAULT DETECTION AND RESPONSE TECHNIQUES

(75) Inventor: Carlos A. Rosero, Buenos Aires (AR)

(73) Assignee: Cummins Inc., Columbus, IN (US)

(*) Notice: Subject to any disclaimer, the term of this patent is extended or adjusted under 35 U.S.C. 154(b) by 1231 days.

(21) Appl. No.: 13/184,843

(22) Filed: Jul. 18, 2011

(65) Prior Publication Data

US 2012/0022762 A1    Jan. 26, 2012

Related U.S. Application Data

(60) Provisional application No. 61/399,776, filed on Jul. 16, 2010.

(51) Int. Cl.
| | |
|---|---|
| *G01M 15/12* | (2006.01) |
| *F02D 41/22* | (2006.01) |
| *F02B 77/08* | (2006.01) |
| *F02D 41/14* | (2006.01) |

(52) U.S. Cl.
CPC ............. *F02D 41/22* (2013.01); *F02B 77/08* (2013.01); *G01M 15/12* (2013.01); *F02D 41/1498* (2013.01); *Y02T 10/40* (2013.01)

(58) Field of Classification Search
CPC ........ F02B 77/08; G01M 15/12; F02D 41/22
USPC ......................................................... 702/183
See application file for complete search history.

(56) References Cited

U.S. PATENT DOCUMENTS

| 4,380,172 A * | 4/1983 | Imam .................... G01H 1/003 702/35 |
| 4,520,694 A * | 6/1985 | Eschrich ................ B60W 30/18 477/109 |
| 4,590,804 A | 5/1986 | Brull |
| 4,975,855 A | 12/1990 | Miller et al. |

(Continued)

FOREIGN PATENT DOCUMENTS

| EP | 1 018 640 B1 | 5/2008 |
| WO | WO 2006/007056 | 1/2006 |

OTHER PUBLICATIONS

FAG OEM, FAG Rolling Bearings, Weppert GmbH & Co., 1997.*

(Continued)

*Primary Examiner* — John Breene
*Assistant Examiner* — Raymond Nimox
(74) *Attorney, Agent, or Firm* — Taft Stettinius & Hollister LLP

(57) ABSTRACT

Systems and methods for detecting, predicting and/or responding to faults are disclosed. In one form, a sensor can be operatively coupled to an engine system having a component and a control system is coupled to the sensor. The sensor can be structured to monitor the engine system and generate corresponding sensor information. The control system can be structured to: generate an operational signature based on the sensor information, estimate whether a fault (e.g., a mechanical fault of the component and/or a performance fault of the engine system) exists based on the operational signature, determine an engine operating mode adjustment if the fault exists and output the engine operating mode adjustment to an output device. Systems and methods for increasing the accuracy by which faults are detected and/or predicted are also disclosed. The engine operating mode adjustment can be applied to protect engine system components from being undesirably damaged to faults.

39 Claims, 5 Drawing Sheets

(56) References Cited

U.S. PATENT DOCUMENTS

| | | | |
|---|---|---|---|
| 5,070,832 A * | 12/1991 | Hapka | F01M 1/22 123/198 D |
| 5,159,563 A | 10/1992 | Miller et al. | |
| 5,381,692 A * | 1/1995 | Winslow | G01M 13/045 340/682 |
| 5,390,545 A | 2/1995 | Doan | |
| 5,613,586 A * | 3/1997 | Schilling | F01P 7/085 192/48.3 |
| 5,949,676 A * | 9/1999 | Elsley | G05B 23/024 700/79 |
| 6,370,957 B1 | 4/2002 | Filippenko et al. | |
| 6,449,564 B1 | 9/2002 | Kliman et al. | |
| 6,687,654 B2 | 2/2004 | Smith, Jr. et al. | |
| 6,756,908 B2 | 6/2004 | Gass et al. | |
| 6,763,312 B1 * | 7/2004 | Judd | 702/56 |
| 6,795,779 B2 | 9/2004 | Delvaux et al. | |
| 6,813,581 B1 | 11/2004 | Snyder | |
| 6,880,784 B1 * | 4/2005 | Wilkinson | B64D 31/06 244/195 |
| 6,889,553 B2 | 5/2005 | Robinson et al. | |
| 7,006,953 B2 | 2/2006 | Takemura et al. | |
| 7,040,295 B2 | 5/2006 | Karem | |
| 7,103,507 B2 | 9/2006 | Gorinevsky et al. | |
| 7,124,637 B2 | 10/2006 | Singhal et al. | |
| 7,222,002 B2 * | 5/2007 | Maine | G01M 15/12 701/100 |
| 7,222,027 B2 | 5/2007 | Gorinevsky et al. | |
| 7,343,265 B2 | 3/2008 | Andarawis et al. | |
| 7,366,627 B2 | 4/2008 | Gordon et al. | |
| 7,379,845 B2 | 5/2008 | Gorinevsky et al. | |
| 7,413,919 B2 | 8/2008 | Qing et al. | |
| 7,458,266 B2 | 12/2008 | Beard et al. | |
| 2002/0138217 A1 * | 9/2002 | Shen | G01H 1/003 702/56 |
| 2005/0096873 A1 | 5/2005 | Klein | |
| 2006/0122809 A1 * | 6/2006 | Clarke | G01M 15/12 702/185 |
| 2008/0284575 A1 | 11/2008 | Breed | |
| 2009/0322373 A1 | 12/2009 | Dooley | |
| 2010/0281843 A1 * | 11/2010 | Smith | F01D 17/08 60/39.091 |

OTHER PUBLICATIONS

International Search Report and Written Opinion, PCT/US2011/04436821, ISR/US, Cummins Inc., Dec. 12, 2011.

* cited by examiner

FAULT DETECTION AND RESPONSE TECHNIQUES

CROSS-REFERENCE TO RELATED APPLICATIONS

This application claims the benefit of U.S. Provisional Application No. 61/399,776, filed Jul. 16, 2010, which is incorporated herein by reference in its entirety.

BACKGROUND

Embodiments exemplarily disclosed herein relate generally to detection of faults within components of complex machinery, and more particularly, but not exclusively to, the detection of mechanical faults, performance faults, or a combination thereof, and control of engine systems based on the same.

Early detection of mechanical faults associated with engine systems may provide for more efficient operation, control, and repair of such systems and may prevent not only high cost system level failures, but also catastrophic failures which may be threatening or dangerous to the environment (such as oil well pump engine failures, coal mining truck spills, fuel truck spills, or the like). Repairs for rotating and/or reciprocating components, such as crankshaft-related warranty repairs, may reach costs in the millions each year for an individual supplier. Components are therefore typically over-designed creating additional cost for the supplier and the customer as well as possible compromises in design efficiency.

Routine monitoring of the components may provide indications relating to potential failure before the failure reaches the catastrophic level. However, this approach often involves significant loss of service time and/or increased labor costs. Unfortunately, current "in situ" detection of mechanical failures such as cracks in components internal to a given system like a reciprocating and/or rotating machine becomes is limited. Indeed, these approaches can be unreliable due to inconsistency and error. Moreover, under certain circumstances, the detection of a potential failure well in advance of it posing a problem may desirable—creating a opportunity for preventative action. Thus, there remains a need for further contributions in this area of technology.

SUMMARY

One embodiment of the present application includes a unique technique to detect and/or predict faults. Another embodiment of the present invention is an automatic fault detection system. Other embodiments include unique methods, systems, devices, and apparatus involving fault detection in reciprocating and/or rotating machinery. Still other embodiments include unique methods, systems, devices, and apparatus for detecting the presence and/or severity of mechanical and/or performance faults; controlling an operation of an engine system based upon detection of mechanical and/or performance faults; differentiating operational signatures of components based on a condition of an engine system, an amount of wear acquired by the engine, and an application for which the engine system is being used; and adjusting the manner in which the engine system is controlled. Still other embodiments include unique methods, systems, devices, and apparatus having a learning capability, artificial intelligence, or the like, for increasing the accuracy by which faults are detected and/or predicted. Further embodiments, forms, objects, aspects, features, benefits, and advantages of the present application shall become apparent from the figures and description provided herewith.

DETAILED DESCRIPTION OF REPRESENTATIVE EMBODIMENTS

Figure 1:
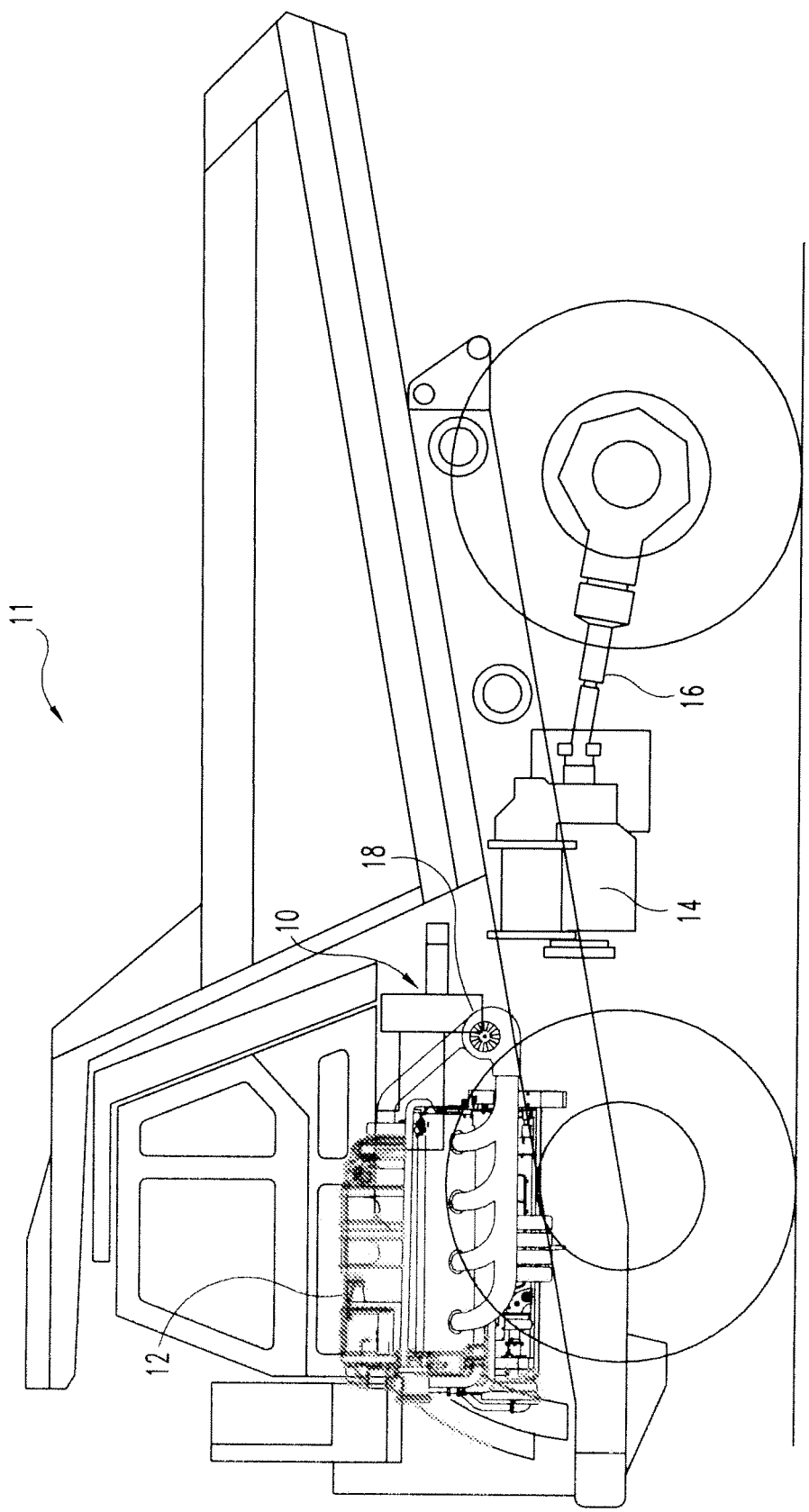
FIG. 1 is a schematic view of an engine system incorporated within a vehicle.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 is a schematic view of an engine system 10 incorporated within a vehicle 11. The engine system 10 may include one or more components and a management system. Generally, the components include any mechanical components disposed in a cooperative arrangement to generate power suitable for use in a desired application, in addition to any other components supporting the function of the mechanical components, and in addition to any other components that are structured to perform some task or function associated with the desired application. This last group of components may, for example, be driven by a component such as an engine of the engine system 10 to perform one or more tasks or functions associated with the desired application. The management system is structured to control engine system 10 by controlling an operation of one or more of the components. Examples of components are provided below. Generally, the management system may include one or more sensors, one or more actuators, an Engine Control Module (ECM), or the like or a combination thereof, to monitor and control an operation of one or more of the components.

In the illustrated embodiment, the engine system 10 is provided as an internal combustion system structured to generate power for a vehicle such as a mining truck or a heavy-duty truck or any other application. Accordingly, the engine system 10 may include a component such as an engine 12. As exemplarily illustrated, the engine 12 may be provided as an internal combustion engine (e.g., a diesel internal combustion engine). It will nevertheless be appreciated that the engine could be provided as any type of internal combustion engine (e.g., a diesel internal combustion engine, a gasoline internal combustion engine, any type of a gas internal combustion engine (e.g., CNG, LNG, LPG, etc.), an ethanol internal combustion engine, or the like or a combination thereof), a hybrid fuel/electric engine, an external combustion engine, an electric motor, a Stirling engine, a turbine engine, a reaction engine, or the like or a combination thereof. Alternatively or additionally, other components may, for example, include a transmission 14, an alternator, a drive axle 16, a turbocharger 18 or the like or a combination thereof. Although not necessarily labeled, other components may, for example, include a power unit (e.g., a compressor, a pump, a water pump, a fuel pump, an oil pump, or the like or a combination thereof), a turbocharger, supercharger, a clutch, an exhaust gas recirculation device, a heat exchanger, a fuel injector, an accessory drive device, a cooling subsystem, a lubrication subsystem, an engine application attachment, mining equipment, drilling equipment, excavating equipment, material conveying equipment, or the like or a combination thereof. It will also be appreciated that a component may also include one or more constituent components of any of the above-mentioned components, and may therefore include a damper, a flywheel, a connecting rod, a camshaft, a cylinder, a push rod, a rocker arm, an engine block, an engine head, a cylinder head, a crankshaft, one or more counterweights of a crankshaft (also referred to herein as a "crankshaft counterweight" or "crankshaft counterweights"), a piston rod, a piston, a bearing (e.g., a journal bearing), a bushing, a sprocket, a chain, a sleeve, a gear, a rod, a shaft (e.g., a rotatable shaft), a housing, a bracket, a bolt, a clamp, a cam, an axle, or the like or a combination thereof.

Figure 2:
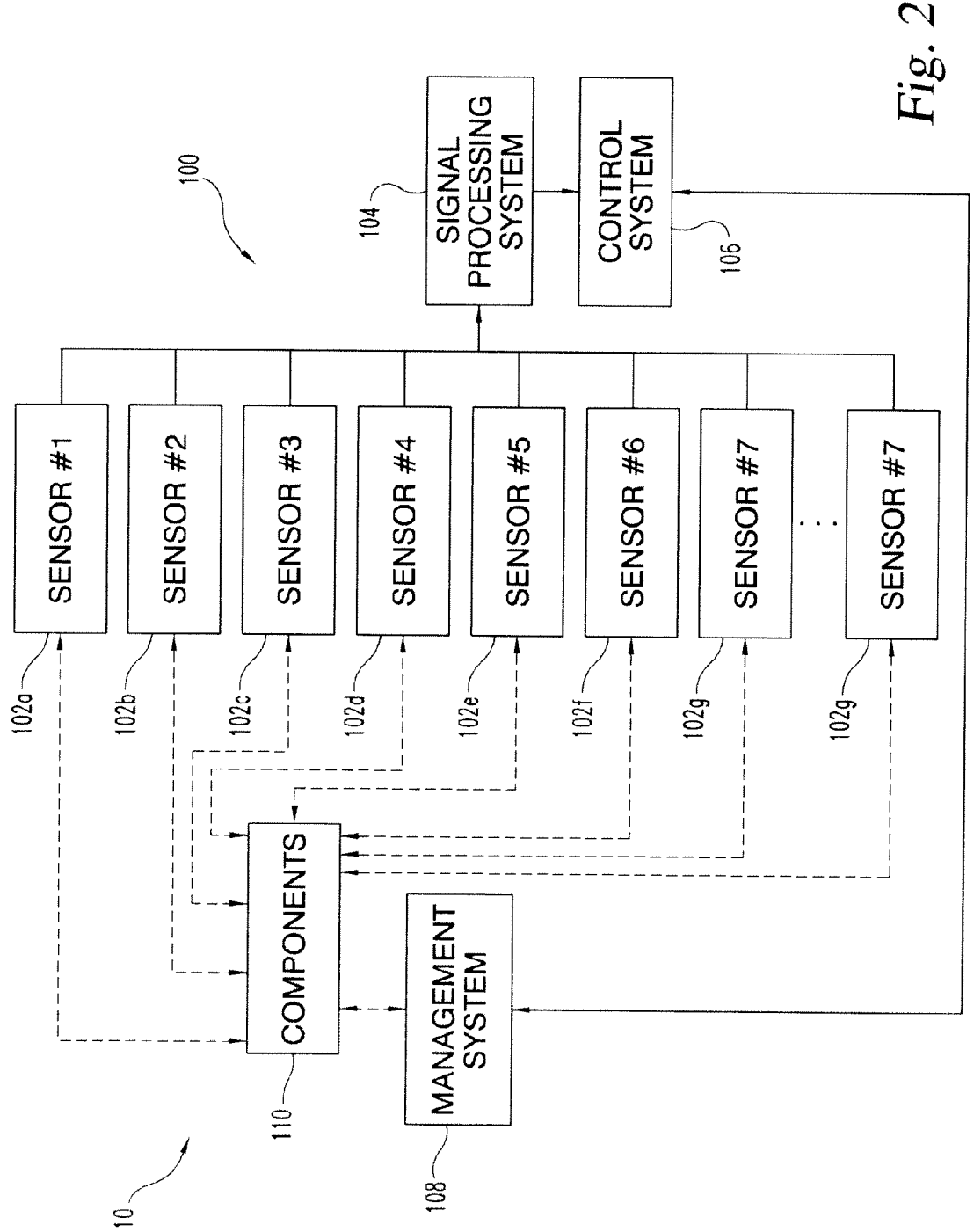
FIG. 2 is a schematic view of a fault detection and response system according to one embodiment.

Referring to FIG. 2, a fault detection and response system, such as fault detection and response system 100, may be coupled to the engine system 10. In one embodiment, the fault detection and response system 100 may be structured to control an operation of the engine system 10 based on the presence and/or severity of a detected mechanical or performance fault. One example of a mechanical fault that can be detected by the fault detection and response system 100 is a crack within a component (e.g., which can be detected due to a change in a torsional response of a given component). Another example of a mechanical fault that be detected is a physical displacement of a component. In embodiments where the mechanical fault is a crack in the component, the existence of the predefined relationship may further indicate the propagation speed of the crack within the component. In another embodiment, the fault detection and response system 100 may be structured to estimate the severity of the mechanical fault of the component of the engine system 10 and control an operation of the engine system 10 based on the estimated severity of the mechanical fault. By controlling an operation of the engine system 10, in some instances, complete mechanical failure of the component can be prevented or otherwise delayed to allow the operator to shutdown the engine 12 at a safer condition, depending on the particular application. Alternatively or additionally, a warning can be provided to prompt discontinued use until a repair is made, a "limp-home" operating mode can be provided, and/or an estimate until the time of complete failure can be provided.

As exemplarily illustrated, the fault detection and response system 100 includes a first sensor 102a, a second sensor 102b, a third sensor 102c, a fourth sensor 102d, a fifth sensor 102e, a sixth sensor 102f and a group of seventh sensors 102g. The first through seventh sensors may be generically referred to as "sensors 102." The fault detection and response system 100 further includes a signal processing system 104 having an input coupled to the output of each sensor 102, and a control system 106 having an input coupled to an output of the signal processing system 104 and an output coupled to the engine system 10 (e.g., an input of a component of the management system 108 such as an ECM, an actuator, or the like). The sensors 102, the signal processing system 104, the control system 106 and the engine system 10 can be communicatively coupled to each other via wired or wireless connections.

The sensors 102 are operatively coupled to the engine system 10 and are structured to monitor one or more operational aspects of the engine system 10 (e.g., during operation of the engine system 10) and generate sensor signals based on the monitoring. In one embodiment, the sensor signals generated contain sensor information representing a property of one or more components 110 (also referred to herein as a "component 110" or "components 110") of the engine system 10. In one embodiment, the sensor information represents a change in a property of a component 110 of the engine system 10.

As used herein, an "operational aspect" of the engine system 10 may, for example, include the vibration frequency of a component 110 in the engine system 10, a vibration pattern of a component 110 of the engine system 10, a temperature of a component 110, a temperature of a fluid (e.g., intake air, water, oil, exhaust gas, etc.) within the engine system 10; a pressure of a fluid within the engine system 10, or the like or a combination thereof. Examples of properties of a component 110 that can be represented by sensor information include vibration of the component (e.g., torsional vibration, linear vibration etc.), displacement of the component, vibration frequency of the component (a drop in vibration frequency can indicates a drop in component stiffness), velocity (e.g., crack propagation, stiffness drop, rotational velocity, etc.) of the component, temperature of the component (and/or temperature of a fluid within the component), pressure of the component (and/or pressure of a fluid within the component), or the like or a combination thereof.

In one embodiment, one or more of the sensors 102 include a sensing element structured to monitor an operational aspect of the engine system 10. Examples of a sensing element that can be included within the sensor 102 include an accelerometer, a strain gauge, and the like. The sensor 102 can include a single sensing element to monitor one or more operational aspects of the engine system 10, or multiple sensing elements (e.g., as a delta sensor) to monitor one or more operational aspects of the engine system 10. Although FIG. 2 illustrates the sensors 102 as separate from the management system 108, one or more of the sensors 102 may be included as part of the management system 108.

In one embodiment, the first sensor 102a may be structured to monitor vibration (e.g., torsional vibration) of a component such as a damper on an internal combustion engine and the second sensor 102b may be structured to monitor vibration (e.g., torsional vibration) of a component such as a flywheel on the internal combustion engine. Accordingly, the first and second sensors 102a and 102b can be used to monitor the difference (delta) in the torsional vibration of the damper and the flywheel. The third sensor 102c may be structured to monitor oil temperature within the internal combustion engine, the fourth sensor 102d may be structured to monitor oil pressure within the internal combustion engine, the fifth sensor 102e may be structured to monitor exhaust gas temperature of the internal combustion engine, the sixth sensor 102f may be structured to monitor intake air pressure of the internal combustion engine and the group of seventh sensors 102g may be structured to monitor vibration of a group of components such as crankshaft counterweights. Collectively, the damper, flywheel and crankshaft counterweights are identified as "components" at 110. Similarly, the components where the oil temperature, oil pressure, exhaust gas temperature and intake air pressure are monitored are collectively identified as "components" at 110.

Although the embodiment illustrated in FIG. 2 depicts all sensors 102a-102g within the fault detection and response system 100 as being coupled to the same signal processing system 104, it will be appreciated that multiple signal processing systems 104 can be provided, and that some or each of the sensors 102a-102g can be coupled to a unique signal processing system 104. It will also be appreciated that the fault detection and response system 100 may include any number of sensors, and may even include one sensor. It will also be appreciated that the fault detection and response system 100 may include any type of sensor.

Figure 3:
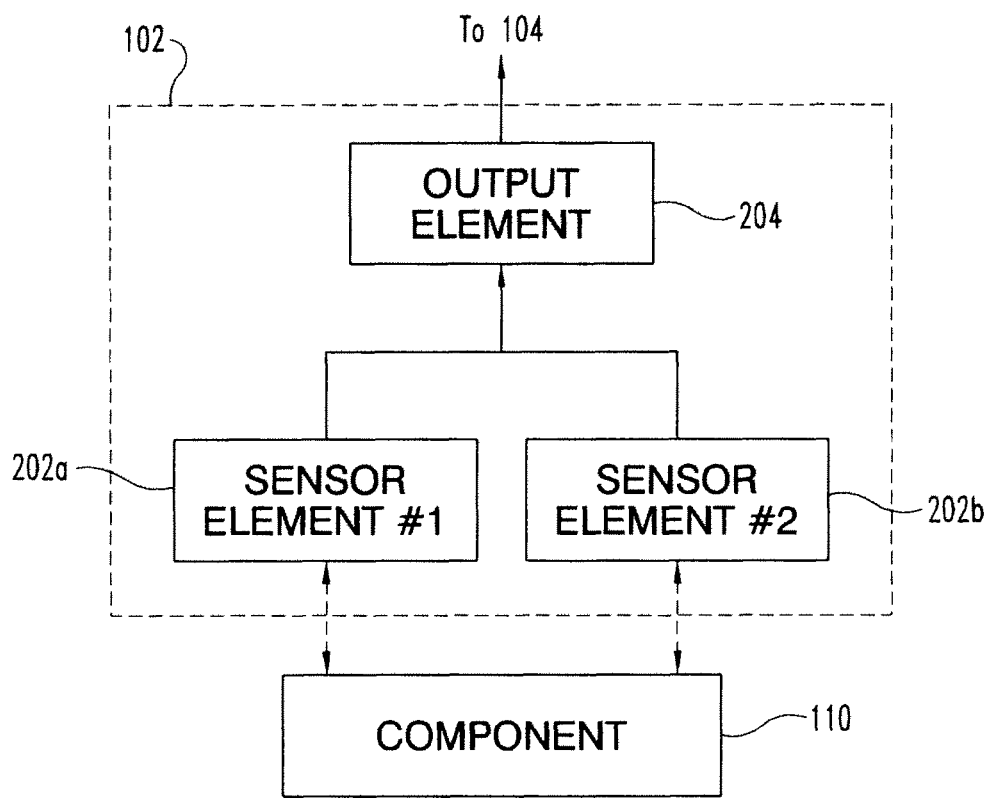
FIG. 3 is a schematic view of the sensor shown in FIG. 1, according to one embodiment.

Referring to FIG. 3, one embodiment of the sensor 102 shown in FIG. 2 includes a first sensor element 202a, a second sensor element 202b and an output element 204. The first sensor element 202a and the second sensor element 202b are spaced apart from each other by any desired distance so as to be operatively coupled to different portions of the same component 110. Each of the first sensor element 202a and the second sensor element 202b generate signals corresponding to the operational aspect monitored at their respective locations relative to the component 110. The output element 204 receives the signals from the first sensor element 202a and the second sensor element 202b, performs an operation on the signals, and outputs the result of that operation as the aforementioned sensor signal of the sensor information. In one embodiment, the output element 204 performs a delta operation on the signals, and outputs the result of that operation (i.e., the difference between the signals) as the aforementioned sensor signal. Although FIG. 3 illustrates an embodiment in which the output element 204 is part of the sensor 102, the output element 204 may be partially or completely included within operating logic of the signal processing system 104, the control system 106, or an ECM of the management system 108 or a combination thereof.

Referring back to FIG. 2, the signal processing system 104 is structured to receive and process the sensor signal generated by the sensor 102. In one embodiment, the signal processing system 104 can include an amplifier structured to amplify the sensor signal generated by the sensor 102. Exemplary amplifiers that may be used include an analog amplifier, a digital amplifier, or a combination thereof. In another embodiment, the signal processing system 104 can include a filter structured to eliminate or otherwise reduce a signal-to-noise ratio in the sensor signal. Exemplary filters that may be used include passive electronic filters, digital filters, mechanical filters, or the like or a combination thereof. In one embodiment, an input of the filter may be coupled to the output of the amplifier. Although FIG. 2 illustrates an embodiment in which the fault detection and response system 100 includes the signal processing system 104, it will be appreciated that the signal processing system 104 may be omitted. Although FIG. 2 illustrates an embodiment in which the signal processing system 104 is separate from the sensor 102 and the control system 106, it will be appreciated that the signal processing system 104 may be completely or partially included within the sensor 102, within operating logic of the control system 106, or a combination thereof. In various embodiments, the signal processing system 104 may be completely or partially included in the operating logic (such as programming instructions) of an Engine Control Module (ECM), or separate therefrom.

The control system 106 is structured to generate an operational signature of a component 110 based on the sensor information. Accordingly, the operational signature can be characterized as a correlation of a property of the component 110 with operational aspects of the engine system 10 that are monitored by the sensors 102 during operation of the engine system 10. The control system 106 is further structured to estimate whether a component 110 of the engine system 10 has a mechanical fault based on the operational signature. If the component 110 is estimated to have a mechanical fault, the control system can control an operation of the engine system 10. In one embodiment, the control system 106 can control an operation of the engine system 10 to reduce a power output of the engine system 10 and/or take any other action. In one embodiment, the control system 106 can control an operation of the engine system 10 by, for example, determining an engine operating mode adjustment and outputting the engine operating mode adjustment to one or more output devices. In some embodiments, an output device can be an ECM of the management system 108, a database, a datalink of an on-board diagnostic system, a dashboard that is local to or remote from the engine system 10, or the like or a combination thereof. In one embodiment, an output device is a device (such as the ECM of the management system 108) structured to control the operation of one or more of the aforementioned components 110 of the engine system 10. In one embodiment, the engine operating mode adjustment, when received by an output device, is configured to cause the output device to adjust an operation of one or more components of the engine system 10 (e.g., the engine 12, a pump, equipment such as mining equipment, etc.), generate an operator alarm, or the like or a combination thereof. By determining and outputting an engine operating mode adjustment, one or more of the aforementioned components 110 of the engine system 10 can be protected from being undesirably damaged due to mechanical and/or performance faults detected by the fault detection and response system 100. In one embodiment, the engine operating mode adjustment can be output by generating a control signal and transmitting the control signal to an output device such as the management system 108 (e.g., the ECM of the management system). The power output of the engine system 10 can be reduced by, for example, de-rating the engine system 10, idling the engine system 10, or shutting the engine system 10 down. In one example, the control system 106 can control the engine system 10 to operate in a "limp home" mode.

Figure 4:
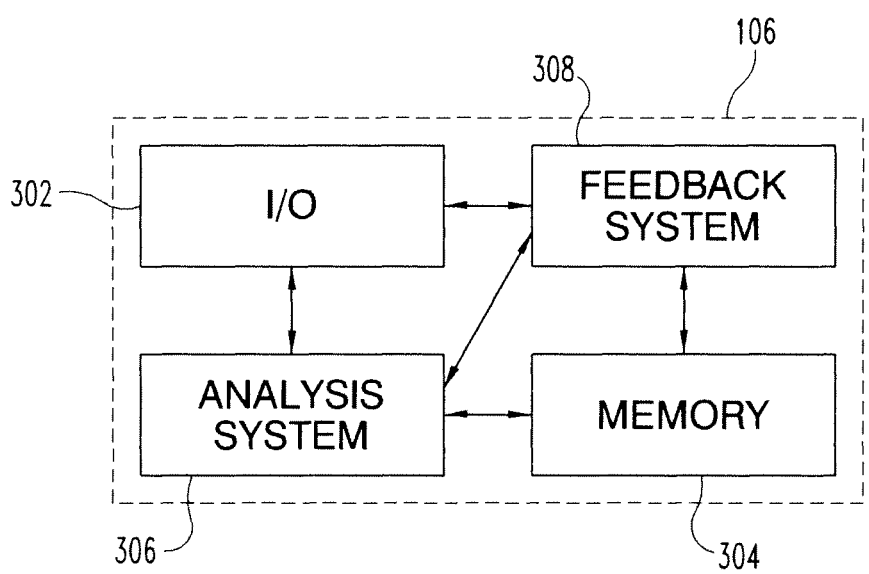
FIG. 4 is a schematic view of the control system shown in FIG. 1, according to one embodiment.

Referring to FIG. 4, one embodiment of the control system 106 shown in FIG. 2 can include an input/output or I/O interface 302 (also referred to herein as an "interface module"), a memory 304 and an analysis system 306 (also referred to herein as an "analysis module") coupled to the I/O interface 302, the memory 304 and a feedback system 308 (also referred to herein as an "feedback module"). The I/O interface 302, the memory 304, the analysis system 306 and the feedback system 308 can be communicatively coupled to each other via wired or wireless connections.

The I/O interface 302 may be provided as any device suitable for receiving sensor signals from the signal processing system 104 and transmitting control signals to an output device (e.g., the management system 108). In one embodiment, the I/O interface 302 may further be structured to transmit and receive information to and from other devices such as diagnostic computers, and the like.

Generally, the memory 304 is structured to store a plurality of standard or "reference" signatures associated with the component 110 in engine system 10. The memory 304 can be provided as one or more components and can be of any volatile or nonvolatile type, including the solid state variety, the optical media variety, the magnetic variety, any combination of these, or such different arrangement as would occur to those skilled in the art. Similar to the operational signature, each reference signature correlates a previously-monitored or previously-modeled property of a reference component with a value within a range of values for one or more operational aspects of the engine system 10 under which the engine system 10 was designed to operate. The reference component is generally structured in the same manner as the actual component 110 within the engine system 10, but is known to not have a mechanical fault. Thus, the reference signature contains reference information corresponding to the component 110 when the component 110 is known to be without a mechanical fault.

In one embodiment, one or more of the reference signatures may further correlate the reference information with engine condition information describing one or more conditions in which the engine system 10 can operate. For example, the engine condition information may indicate an engine system in a new condition, an engine system in a repaired condition, or the like. In another embodiment, one or more of the reference signatures may further correlate the reference information with engine wear information describing an amount of wear (e.g., on a scale from 0 to 10; 0 representing no wear and 10 representing a significant amount of wear) acquired by the engine system 10. In yet another embodiment, one or more of the reference signatures may further correlate the reference information with engine application information describing the application for which the engine system is being used. For example, the engine application information may indicate that an engine system can be used in a mining application, an automotive application, a power unit application (e.g., a pump application, a compressor application, etc.), a marine application, an aviation application, a power generation application, (e.g., base load generation, prime, peak power generation, peaking power generation, etc.), an agriculture application, a construction application, an oil and gas application, or the like or a combination thereof. It will be appreciated that one or more of the reference signatures may correlate the reference information with engine condition information, engine wear information, engine application information, or the like or any combination thereof.

The analysis system 306 is structured to perform a comparison between the operational signature and the reference signature and determine whether the operational signature has a predefined relationship with the reference signature based on the comparison. If the operational signature is determined to have a predefined relationship with the reference signature, the analysis system 306 estimates that the component 110 has a mechanical fault, determines an engine operating mode adjustment and outputs the engine operating mode adjustment to an output device.

Generally, the predefined relationship represents a discrepancy between the operational signature and the reference signature. When there is a discrepancy between the operational signature and the reference signature, it can be estimated that the component 110 has a mechanical fault. As will be appreciated, the magnitude and propagation speed of the discrepancy between the operational signature and the reference signature can vary. Therefore the severity of the mechanical fault of the component 110 can be estimated to increase with increasing discrepancy between the operational signature and the reference signature. For example, on a scale of 1 to 10, a discrepancy between 1 and 3 could represent a minimally severe mechanical fault, a discrepancy between 4 and 7 could represent a moderately severe mechanical fault and a discrepancy between 8 and 10 could represent an extremely severe mechanical fault.

In one embodiment, the analysis system 306 can be structured to compare the operational signature and the reference signature to determine whether one of many predefined relationships selected from a group of predefined relationships exists between the operational signature and the reference signature. In this embodiment, the group of predefined relationships can, for example, include a first predefined relationship representing a first discrepancy, a second predefined relationship representing a second discrepancy greater than the first discrepancy, a third predefined relationship representing a third discrepancy greater than the second discrepancy, and so on. Thus, the existence of a predefined relationship not only indicates the estimated presence of a mechanical fault within a component 110, but also indicates the estimated severity of the mechanical fault of the component 110.

In one embodiment, the analysis system 306 can generate a control signal based on the specific predefined relationship that exists between the operational signature and the reference signature. For example, when the first predefined relationship exists between the operational signature and the reference signature, the analysis system 306 can generate a control signal that simply causes an alarm to be generated to inform an operator and/or to a remote dashboard. When the second predefined relationship exists, the analysis system 306 can, for example, generate a control signal configured to reduce a power output by the engine system 10 to a reduced power output level (e.g., to idle the engine system 10). When the third predefined relationship exists, the analysis system 306 can, for example, generate a control signal configured to shut the engine system 10 down. It will be appreciated that the control signal can be configured to reduce the power output by the engine system 10 in any manner to, for example, de-rate the engine system 10, idle the engine system 10, or shut the engine system 10 down. To minimize the risk of an adverse consequence to shutdown of the engine system 10 (e.g., a mining truck unexpectedly stopping, a marine vessel not being able to maneuver, etc.), the control signal can, in some embodiments, be configured to permit the engine system 10 to be shut down automatically or manually. In the case of automatic shutdown, control signal can be configured to shut the engine system 10 down after a certain period of time or "delay period" has elapsed after the second predefined relationship was determined to exist. The delay period may be any period of time (e.g., 90 seconds, 150 seconds, 180 seconds, or the like) and may be set by a user interfacing with the control system 106, with an ECM of the management system 108, or the like or a combination thereof. In another embodiment, the delay period may be preset within the control system 106, the ECM of the management system 108, or the like or a combination thereof. In one embodiment, the delay period may correspond to an application for which the engine system 10 is being used.

Further because reference information in the reference signature can be correlated with other information such as engine condition information, engine wear information, and engine application information, the analysis system 306 can be structured to determine whether the engine system 10 is a new engine system or a repaired engine system, whether the engine system 10 has a relatively high amount of wear or has a relatively low amount of wear, whether the engine system 10 is used in one application as opposed to any other application, or the like or a combination thereof.

In one embodiment, the analysis system 306 may be structured to adjust or update any reference signature stored in memory 304 based on a standard calibration (e.g., as implemented with a service tool for loading programs into the control system 106), through a standard adaptive learning routine (such as those including an initial learning trial) or other artificial intelligence routine, or the like or a combination thereof. In one embodiment, the analysis system 306 may update an initially-stored reference signature based upon, for example, an application for which the engine system 10 is being used and as one or more components 110 in the engine system 10 (e.g., the engine 12) accumulate wear, undergo repairs, experience load cycle effects, etc. The reference signature is continuously corrected by the analysis system 306. By continuously correcting an initially-stored reference signature, the likelihood that the control system 106 will generate erroneous engine operation mode adjustments can be reduced.

In one embodiment, the analysis system 306 may be structured to detect performance failures or faults of the engine system 10 (e.g., misfiring, low power, over injection, etc.) based on the relationship between the operational signature and the reference signature. Such detection of performance failures or faults can be accomplished in a manner similar to that described above with respect to the detection of mechanical faults.

The feedback system 308 is structured to receive feedback information indicating whether the operational signature incorrectly indicates the presence of a mechanical and/or performance fault. The feedback information can be received via the I/O interface 302, the analysis system 306, the memory 304, or the like or a combination thereof. In one embodiment, the feedback system 308 is further structured to adjust the predefined relationship based on the feedback information (e.g., such that a subsequent comparison between the operational signature and the reference signature will at least be more likely to correctly indicate the presence of a mechanical and/or performance fault). Accordingly, the feedback system 308 can be used to eliminate or otherwise reduce the number of false alarms generated by the fault detection and response system 100. In one embodiment, the feedback system 308 adjusts the predefined relationship by generating and transmitting an adjustment signal to the analysis system 306. Accordingly, the feedback system 308 and analysis system 306 are structured to impart a learning capability or artificial intelligence to the fault detection and response system 100 to eliminate or otherwise reduce the number of false alarms generated by the fault detection and response system 100. Although FIG. 4 illustrates an embodiment in which the control system 106 includes the feedback system 308, it will be appreciated that the feedback system 308 may be omitted from the control system 106.

Although FIG. 2 illustrates the control system 106 as separate from the management system 108, it will be appreciated that one or more of the components of the control system 106, or the functions performed by one or more of the components of the control system 106, may be included as part of, or be performed by, the management system 108. For example, in embodiments where the management system 108 includes an ECM, one or more of the I/O interface 302, the memory 304, the analysis system 306 and the feedback system 308 can be included as part of the ECM. In another example, the functions performed by one or more of the I/O interface 302, the memory 304, the analysis system 306 and the feedback system 308 may be performed by the ECM.

The fault detection and response system 100, exemplarily described with respect to the numerous embodiments herein, can be structured to operate automatically (e.g., without instruction from a user) to control an operation of the engine system 10 based on the presence and/or severity of a detected mechanical and/or performance fault. In one embodiment, automatic operation of the fault detection and response system 100 is accomplished by operating the fault detection and response system 100 continuously (e.g., while the engine system 10 is in operation). In another embodiment, automatic operation is accomplished by operating the fault detection and response system 100 whenever a predefined event occurs. Examples of a predefined event include: the generation of a periodic signal generated by the control system 106 or an ECM in the management system 108; the generation of a signal generated by the ECM in the management system 108 indicating that the engine system 10 has been operating for a particular amount of time, under a particular load, at a particular temperature, or the like or a combination thereof; or the like or a combination thereof.

One or more components such as the output element 204, the signal processing system 104, the analysis system 306, the feedback system 308 and the ECM in the management system 108 may, for example, include a processor (not shown) that is structured to execute operating logic defining various control, determining, comparing, storing and/or adjusting functions. This operating logic may be in the form of dedicated hardware, such as a hardwired state machine, programming instructions, and/or a different form as would occur to those skilled in the art. The processor may be provided as a single component, or a collection of operatively coupled components; and may be comprised of digital circuitry, analog circuitry, or a hybrid combination of both of these types. When of a multi-component form, the processor may have one or more components remotely located relative to the others. The processor can include multiple processing units arranged to operate independently, in a pipeline processing arrangement, in a parallel processing arrangement, and/or such different arrangement as would occur to those skilled in the art. In one embodiment, the processor is a programmable microprocessing device of a solid-state, integrated circuit type that includes one or more processing units and memory. The processor can include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, and/or different circuitry or functional components as would occur to those skilled in the art to perform the desired control, management, and/or regulation functions. The memory devices can be comprised of one or more components and can be of any volatile or nonvolatile type, including the solid state variety, the optical media variety, the magnetic variety, any combination of these, or such different arrangement as would occur to those skilled in the art. In one form, the processor includes a computer network interface to facilitate communications using the Controller Area Network (CAN) standard among various components of the fault detection and response system 100 and/or components not included in the depicted system, as desired.

Figure 5:
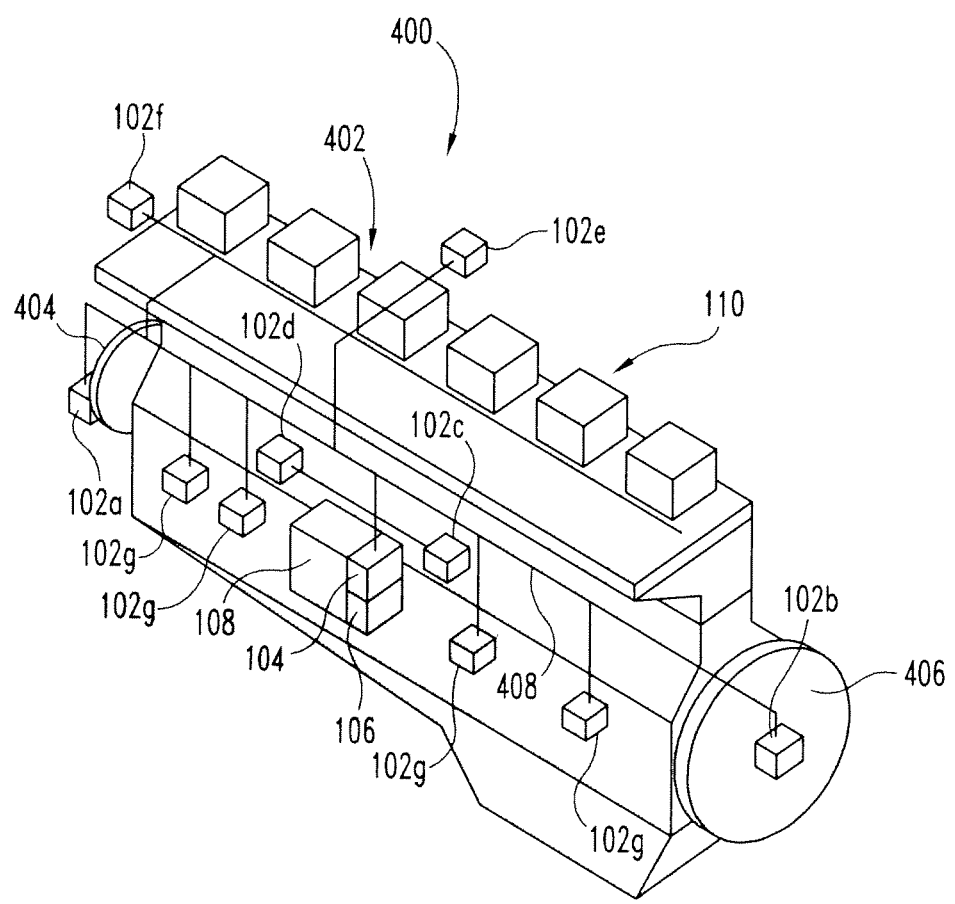
FIG. 5 is a somewhat schematic view of one embodiment of a fault detection and response system coupled to an engine system.

Referring to FIG. 5, an engine system, such as engine system 400, may include a management system 108 and a component 110. As exemplarily illustrated, the management system 108 includes an ECM and the component 110 includes an internal combustion engine 402 and constituent components such as a damper 404 and a flywheel 406 connected to opposite ends of a crankshaft (not labeled). FIG. 5 also illustrates a fault detection and response system structured to detect the presence of a mechanical fault (e.g., a crack) within a component (e.g., the crankshaft) of the internal combustion engine 402 and output an engine operation mode adjustment to the ECM of the management system 108. In view of the discussion above, it will also be appreciated that the fault detection and response system shown in FIG. 5 may also be structured to detect the presence of a performance fault of the internal combustion engine 402. Accordingly, the fault detection and response system can include the aforementioned first to seventh sensors 102a-102g, the signal processing system 104 and the control system 106. Although the fault response system is illustrated as including the second sensor 102b, it will be appreciated that this component may be omitted depending on the specific configuration of the engine 402.

As exemplarily shown, the first sensor 102a is operatively coupled to the damper 404, the second sensor 102b is operatively coupled to the flywheel 406, the third sensor 102c is operatively coupled to a structure (e.g., an oil gallery at a cylinder block of the internal combustion engine 402) where the oil temperature for the internal combustion engine 402 can be measured, the fourth sensor 102d is operatively coupled to a structure (e.g., an oil gallery at cylinder block of the cylinder block of the internal combustion engine 402) where the oil pressure for the internal combustion engine 402 can be measured, the fifth sensor 102e is operatively coupled to a structure (e.g., an exhaust manifold of the internal combustion engine 402) where the exhaust gas temperature for the internal combustion engine 402 can be measured, the sixth sensor 102f is operatively coupled to the a structure (e.g., the intake air manifold) of the internal combustion engine 402 and the group of seventh sensors 102g are operatively coupled to the crankshaft counterweights (not shown) attached to the internal combustion engine 402.

In one embodiment, the first sensor 102a may be provided as a delta sensor (e.g., as described above with respect to FIG. 3) and be structured to monitor a vibration property of the damper 404. Similarly, the second sensor 102b may be provided as a delta sensor (e.g., as described above with respect to FIG. 3) and be structured to monitor a vibration property of the flywheel 406. The third and fifth sensors 102c and 102e may be provided as temperature sensors whereas the fourth and sixth sensors 102d and 102f may be provided as pressure sensors. The seventh sensors 102g may be provided as any suitable type of vibration sensor. The signal processing system 104 is structured to process (e.g., amplify and/or filter) sensor signals generated by the first to seventh sensors 102a-102g and thereafter transmit the sensor signals to the control system 106 (e.g., via wired connections 408) as sensor information. In one embodiment, the control system 106 is structured to generate an operational signature based on sensor information generated by one or more of the sensors 102a-102g. For example, the operational signature can be generated based on sensor information generated by sensors 102a-102g, sensor information generated by sensors 102a and 102c-102g, sensor information generated by sensors 102a and 102b, or sensor information generated by sensor 102a. In one embodiment, the accuracy of the operational signature generated can be increased by increasing the number of sensors used.

Many different embodiments of the present application are envisioned. For example, in a first of such other embodiments, a system can include an engine system having a component; a sensor operatively coupled to the engine system, the sensor being structured to generate sensor information; a control system coupled to the sensor and the engine system. The control system can be structured to: generate an operational signature of the component based on the sensor information; estimate whether the component has a mechanical fault based on the operational signature; determine an engine operating mode adjustment based on the operational signature if the component is estimated to have a mechanical fault; and output the engine operating mode adjustment to an output device.

In the aforementioned first embodiment, the sensor can be structured to monitor a vibration of the component during operation of the engine system. In the aforementioned first embodiment, the sensor can include an accelerometer. In the aforementioned first embodiment, the sensor can include a delta sensor. In the aforementioned first embodiment, the sensor information can represent a change in a vibration characteristic of the component.

In the aforementioned first embodiment, the control system can include: a memory structured to store a reference signature containing information corresponding to the component when the component does not have a mechanical fault; and an analysis system coupled to the memory. The analysis system may be structured to: perform a comparison between the operational signature and the reference signature; determine whether the operational signature has a predefined relationship with the reference signature based on the comparison; and estimate that the component has the mechanical fault if the operational signature has the predefined relationship with the reference signature.

In the aforementioned first embodiment, the control system can be further structured to: receive other information representing whether the estimate is incorrect; and adjust the predefined relationship based on the other information.

In the aforementioned first embodiment, the reference signature may further contain information corresponding to a condition of the component. The condition can be selected from the group consisting of a new component and a repaired component.

In the aforementioned first embodiment, the reference signature can further contain information corresponding to an amount of wear of the engine system.

In the aforementioned first embodiment, the reference signature can further contain information corresponding to an application of the engine system. The reference signature can contain information corresponding to an application of the engine system selected from the group consisting of an automotive application, an agriculture application, a construction application, an industrial application, an oil and gas application, a power unit application, a mining application, a marine application, an aviation application, and a power generation application.

In the aforementioned first embodiment, the analysis system can be further structured to update the reference signature based upon at least one selected from the group consisting of an application for which the engine system is being used, an extent to which a component of the engine system accumulates wear, a repair of a component of the engine system, and an extent to which a component of the engine system experiences load cycle effects.

In the aforementioned first embodiment, the component can be at least one selected from the group consisting of: a crankshaft, a piston rod, a piston, an engine block, an engine head, a turbocharger apparatus, an exhaust gas recirculation device, a heat exchanger, a fuel injector, a mechanical actuator, a journal bearing, a rotatable shaft, a cam, an axle, a flywheel, an accessory drive device, a power unit, a cooling subsystem, an engine application attachment, and a lubrication subsystem. In the aforementioned first embodiment, the component can be at least one selected from the group consisting of mining equipment, drilling equipment, excavating equipment, and material conveying equipment.

In the aforementioned first embodiment, the system may further include a means for modifying the reference signature. The modifying means includes an artificial intelligence routine configured to continuously correct or modify the reference signature. Additionally or alternatively, the modifying means includes a service tool for loading new programming into the control system.

In a second of such other embodiments, a method may include: receiving sensor information from a sensor operatively coupled to an engine system having a component; generating an operational signature of the component based on the sensor information; estimating whether the component has a mechanical fault based on the operational signature; determining an engine operation mode adjustment if the component is estimated to have a mechanical fault; and outputting the engine operation mode adjustment to an output device.

In the aforementioned second embodiment, the method can further include: comparing the operational signature with a reference signature containing information corresponding to the component when the component does not have the mechanical fault; determining whether the operational signature has a predefined relationship with the reference signature based on the comparison; and estimating that the component has the mechanical fault if the operational signature has the predefined relationship with the reference signature.

In the aforementioned second embodiment, the method may further include: receiving other information indicating whether the estimating is incorrect; and adjusting the predefined relationship based on the other information.

In a third of such other embodiments, a method may include powering operation of a system with an internal combustion engine; during the operation of the system, monitoring vibration of one or more components of the system; generating an operational signature based on the vibration; with the system, performing a comparison of the operational signature to a reference signature; and indicating whether at least one of the components has a mechanical fault as a function of the comparison with the system.

In the aforementioned third embodiment, the method may include rotating the at least one of the components when the operation of the system is normal.

In the aforementioned third embodiment, the method may include reciprocating the at least one of the components when the operation of the system is normal.

In the aforementioned third embodiment, the method may include indicating two or more of the components has mechanically failed.

In the aforementioned third embodiment, the method may include, with the system, updating the reference signature. The updating may include operating an adaptive learning routine. Additionally or alternatively, the updating may include adjusting for nominal wear.

In the aforementioned third embodiment, the system is one of a vehicle, a power unit, and an electric power generation device (or any other system capable of use in an application as defined herein).

In the aforementioned third embodiment, the one or more components can be selected from the group consisting of: a crankshaft, a piston rod, a piston, an engine block, an engine head, a turbocharger apparatus, an exhaust gas recirculation device, a heat exchanger, a fuel injector, a mechanical actuator, a journal bearing, a rotatable shaft, a cam, an axle, a flywheel, an accessory drive device, a power unit, a cooling subsystem, an engine application attachment, and a lubrication subsystem. In the aforementioned third embodiment, the one or more components can be selected from the group consisting of mining equipment, drilling equipment, excavating equipment, and material conveying equipment.

In a fourth of such other embodiments, a system may include an interface module structured to receive sensor information from a sensor operatively coupled to an engine system having a component; and an analysis module coupled to the interface module. The analysis module may be structured to: generate an operational signature of the component based on the sensor information; estimate whether the component has a mechanical fault based on the operational signature; determine an engine operating mode adjustment based on the operational signature if the component is estimated to have a mechanical fault; and output the engine operating mode adjustment to the interface module.

In a fifth of such other embodiments, a system may include: means for receiving sensor information from a sensor operatively coupled to an engine system having a component; means for generating an operational signature of the component based on the sensor information; means for estimating whether the component has a mechanical fault based on the operational signature; means for determining an engine operation mode adjustment if the component is estimated to have a mechanical fault; and means for outputting the engine operation mode adjustment to an output device.

In the aforementioned fifth embodiment, the system can further include: means for comparing the operational signature with a reference signature containing information corresponding to the component when the component does not have the mechanical fault; means for determining whether the operational signature has a predefined relationship with the reference signature based on the comparison; and means for estimating that the component has the mechanical fault if the operational signature has the predefined relationship with the reference signature.

In the aforementioned fifth embodiment, the system may further include: means for receiving other information indicating whether the estimating is incorrect; and means for adjusting the predefined relationship based on the other information.

In a sixth of such other embodiments, a system may include means for powering operation of a system with an internal combustion engine; means for monitoring vibration of one or more components of the system during the operation of the system; means for generating an operational signature based on the vibration; means for performing a comparison of the operational signature to a reference signature with the system; and means for indicating whether at least one of the components has a mechanical fault as a function of the comparison with the system.

In the aforementioned sixth embodiment, the system may include means for rotating the at least one of the components when the operation of the system is normal.

In the aforementioned sixth embodiment, the system may include means for reciprocating the at least one of the components when the operation of the system is normal.

In the aforementioned sixth embodiment, the system may include means for indicating two or more of the components has mechanically failed.

In the aforementioned sixth embodiment, the system may include means for updating the reference signature. The means for updating may include means for operating an adaptive learning routine. Additionally or alternatively, the means for updating may include means for adjusting for nominal wear (e.g., by continuously correcting the reference signature).

In the aforementioned sixth embodiment, the system is one of a vehicle, a power unit, and an electric power generation device.

In the aforementioned sixth embodiment, the one or more components can be selected from the group consisting of: a crankshaft, a piston rod, a piston, an engine block, an engine head, a turbocharger apparatus, an exhaust gas recirculation device, a heat exchanger, a fuel injector, a mechanical actuator, a journal bearing, a rotatable shaft, a cam, an axle, a flywheel, an accessory drive device, a power unit, a cooling subsystem, an engine application attachment, and a lubrication subsystem.

In a seventh of such other embodiments, methods and systems are provided to protect any of the aforementioned components of the engine system from damage due to faults (e.g., mechanical faults, performance faults, etc.).

In an eighth of such other embodiments, a system can include an engine system having a component; a sensor operatively coupled to the engine system, the sensor being structured to generate sensor information; a control system coupled to the sensor and the engine system. The control system can be structured to: generate an operational signature of the component based on the sensor information; estimate whether the engine system has a performance fault based on the operational signature; determine an engine operating mode adjustment based on the operational signature if the engine system is estimated to have a performance fault; and output the engine operating mode adjustment to an output device.

In a ninth of such other embodiments, a method may include: receiving sensor information from a sensor operatively coupled to an engine system having a component; generating an operational signature of the component based on the sensor information; estimating whether the engine system has a performance fault based on the operational signature; determining an engine operation mode adjustment if the engine system is estimated to have a performance fault; and outputting the engine operation mode adjustment to an output device.

In a tenth of such other embodiments, a system may include an interface module structured to receive sensor information from a sensor operatively coupled to an engine system having a component; and an analysis module coupled to the interface module. The analysis module may be structured to: generate an operational signature of the component based on the sensor information; estimate whether the engine system has a performance fault based on the operational signature; determine an engine operating mode adjustment based on the operational signature if the engine system is estimated to have a performance fault; and output the engine operating mode adjustment to the interface module.

In an eleventh of such other embodiments, a system may include: means for receiving sensor information from a sensor operatively coupled to an engine system having a component; means for generating an operational signature of the component based on the sensor information; means for estimating whether the engine system has a performance fault based on the operational signature; means for determining an engine operation mode adjustment if the engine system is estimated to have a performance fault; and means for outputting the engine operation mode adjustment to an output device.

In a twelfth of such other embodiments, a system may include means for powering operation of a system with an internal combustion engine; means for monitoring vibration of one or more components of the system during the operation of the system; means for generating an operational signature based on the vibration; means for performing a comparison of the operational signature to a reference signature with the system; and means for indicating whether the internal combustion engine has a performance fault as a function of the comparison with the system.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by any claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein are desired to be protected.

What is claimed is:

1. A system comprising:
   an engine system including a flywheel and a damper;
   a first sensor and a second sensor operatively coupled to the engine system, the first sensor and the second sensor being structured to generate sensor information regarding a torsional vibration difference between the flywheel and the damper;
   a control system coupled to the first sensor, the second sensor, and the engine system, the control system including a memory and a plurality of reference signatures for the flywheel and the damper stored in the memory that include reference information for the torsional vibration difference between the flywheel and the damper without a mechanical fault, the control system being configured to:
   generate an operational signature of the flywheel and the damper based on the sensor information generated during operation of the engine system;
   update a reference signature of the flywheel and the damper, wherein the reference signature is selected from the plurality of reference signatures;
   compare the operational signature with the reference signature;

estimate whether a fault exists within the engine system based on the comparison of the operational signature with the reference signature;

determine an engine operating mode adjustment based on the operational signature if a fault is estimated to exist;

output the engine operating mode adjustment to an output device; and operate the engine system in response to the engine operation mode adjustment.

2. The system of claim 1, wherein the first sensor and the second sensor are structured to monitor a vibration of the flywheel and the damper during operation of the engine system.

3. The system of claim 1, wherein the first sensor and the second sensor comprise an accelerometer.

4. The system of claim 1, wherein the first sensor and the second sensor comprise a delta sensor.

5. The system of claim 1, wherein the fault includes a mechanical fault of at least one of the flywheel and the damper.

6. The system of claim 1, wherein the fault includes a performance fault of the engine system.

7. The system of claim 1, wherein the control system comprises:
a memory structured to store the reference signature containing information corresponding to the flywheel and the damper when the engine system does not have a mechanical fault; and
an analysis system coupled to the memory and structured to:
perform the comparison between the operational signature and the reference signature;
determine whether the operational signature has a predefined relationship with the reference signature based on the comparison; and
estimate that the engine system has the mechanical fault if the operational signature has the predefined relationship with the reference signature.

8. The system of claim 7, wherein the control system is further structured to:
receive other information representing whether the estimate is incorrect; and
adjust the predefined relationship based on the other information.

9. The system of claim 7, wherein the reference signature further contains information corresponding to a condition of the flywheel and the damper.

10. The system of claim 9, wherein the condition is selected from the group consisting of a new component of the engine system and a repaired component of the engine system.

11. The system of claim 7, wherein the reference signature further contains information corresponding to an amount of wear of the engine system.

12. The system of claim 1, wherein the control system is configured to:
select the reference signature based on an application for which the engine system is to be used; and
update the selected reference signature of the flywheel and the damper for nominal wear.

13. The system of claim 7, wherein the analysis system is further structured to continuously correct the reference signature based upon at least one selected from the group consisting of an application for which the engine system is being used, an extent to which a component of the engine system accumulates wear, a repair of a component of the engine system, and an extent to which a component of the engine system experiences load cycle effects.

14. The system of claim 1, wherein the engine system further includes components selected from the group consisting of: a crankshaft, a piston rod, a piston, an engine block, an engine head, a turbocharger apparatus, an exhaust gas recirculation device, a heat exchanger, a fuel injector, a mechanical actuator, a journal bearing, a rotatable shaft, a cam, an axle, an accessory drive device, a power unit, a cooling subsystem, an engine application attachment, and a lubrication subsystem.

15. The system of claim 1, wherein the engine system includes at least one component selected from the group consisting of mining equipment, drilling equipment, excavating equipment, and material conveying equipment.

16. The system of claim 7, further comprising a means for modifying the reference signature.

17. The system of claim 16, wherein the modifying means includes an artificial intelligence routine.

18. The system of claim 16, wherein the modifying means includes a service tool for loading new programming into the control system.

19. A method, comprising:
powering operation of an engine system including a flywheel and a damper;
receiving, at a controller, sensor information regarding a torsional vibration difference between the flywheel and the damper from a first sensor and a second sensor operatively coupled to the engine system;
generating, with the controller, an operational signature of the flywheel and the damper based on the sensor information;
selecting, from a memory of the controller, a reference signature from a plurality of reference signatures for the flywheel and the damper that each include reference information for the torsional vibration difference corresponding to the engine system operating without a mechanical fault;
updating, with the controller, the selected reference signature of the flywheel and the damper;
estimating whether the engine system has a mechanical fault based on a comparison of the operational signature with the selected reference signature;
determining an engine operation mode adjustment if the component is estimated to have a mechanical fault; and
operating the engine system in response to the engine operation mode adjustment.

20. The method of claim 19, further comprising:
comparing the operational signature with the selected reference signature containing information corresponding to the component when the component does not have the mechanical fault;
determining whether the operational signature has a predefined relationship with the selected reference signature based on the comparison; and
estimating that the component has the mechanical fault if the operational signature has the predefined relationship with the selected reference signature.

21. The method of claim 20, further comprising:
receiving other information indicating whether the estimating is incorrect; and
adjusting the predefined relationship based on the other information.

22. A method, comprising:
powering operation of a system with an internal combustion engine;

during the operation of the system, monitoring a torsional vibration difference between a flywheel and a damper of the internal combustion engine;

generating an operational signature based on the torsional vibration difference;

selecting a reference signature from a plurality of reference signatures for the flywheel and the damper, wherein each reference signature includes reference information for the torsional vibration difference corresponding to the internal combustion engine operating without a mechanical fault;

with the system, updating the selected reference signature of the flywheel and the damper based on;

with the system, performing a comparison of the operational signature to the updated reference signature;

determining whether the internal combustion engine has a mechanical fault as a function of the comparison;

determining an estimated severity of the mechanical fault based on the comparison;

providing, based on the estimated severity, one of a warning signal to display on an output device and a power output level reduction signal to the internal combustion engine; and operating the engine system in response to the engine operation mode adjustment.

23. The method of claim 22, which includes rotating the flywheel and the damper when the operation of the system is normal.

24. The method of claim 22, which includes indicating the internal combustion engines has mechanically failed.

25. The method of claim 22, wherein the updating includes operating an adaptive learning routine.

26. The method of claim 22, wherein the system is one of a vehicle, a power unit, and an electric power generation device.

27. The method of claim 22, wherein the system further includes one or more components selected from the group consisting of: a crankshaft, a piston rod, a piston, an engine block, an engine head, a turbocharger apparatus, an exhaust gas recirculation device, a heat exchanger, a fuel injector, a mechanical actuator, a journal bearing, a rotatable shaft, a cam, an axle, an accessory drive device, a power unit, a cooling subsystem, an engine application attachment, and a lubrication subsystem.

28. The method of claim 22, wherein the system includes one or more components selected from the group consisting of mining equipment, drilling equipment, excavating equipment, and material conveying equipment.

29. A system, comprising:
an electronic controller operably coupled to an engine system including a damper and a flywheel, the electronic controller being structured to receive sensor information regarding a torsional vibration difference between the damper and the flywheel from a first sensor and a second sensor operatively coupled to the engine system to determine a control signal, and to provide the control signal to the engine system; and the electronic controller including a memory and one or more corresponding reference signatures for the damper and flywheel stored in the memory that includes reference information for the torsional vibration difference corresponding to the operation of the engine system without a mechanical fault, the electronic controller further being configured to:

generate an operational signature of the flywheel and the damper based on the sensor information;

update the one or more corresponding reference signatures of the flywheel and the damper;

compare the operational signature with the one or more corresponding reference signatures;

estimate whether the engine system has a mechanical fault based on the comparison of the operational signature with the one or more corresponding reference signatures;

determine an engine operating mode adjustment based on the operational signature if the engine system is estimated to have a mechanical fault;

output the engine operating mode adjustment,
wherein the control signal is based on the engine operating mode adjustment; and operate the engine system in response to the engine operation mode adjustment.

30. The system of claim 29, wherein the electronic controller is further structured to:
determine a number of predefined relationships that exist between the operational signature and the one or more corresponding reference signatures based on a comparison between the operational signature of the flywheel and the damper and the reference signatures corresponding to the flywheel and the damper, wherein the engine operating mode adjustment determination is further based on the number of predefined relationships.

31. The system of claim 30, wherein the engine operating mode adjustment comprises an alarm signal when the number of predefined relationships determined to exist meets a first condition, an engine system power reduction signal when the total number of predefined relationships determined to exist meets a second condition, and an engine system shut-down signal when the total-number of predefined relationships determined to exist meets a third condition.

32. The system of claim 29, wherein the electronic controller is further structured to:
determine an estimated severity of the fault,
wherein the engine operating mode adjustment is further determined based on the estimated severity.

33. The system of claim 29, wherein the operational signature of the flywheel and the damper is further determined based on at least one of a condition information of the internal combustion engine and a wear information of the internal combustion engine.

34. The system of claim 29, wherein the engine operating mode adjustment includes at least one of a power output level reduction output and an alarm output.

35. The system of claim 22, wherein the power output level reduction of the engine system includes a de-rate condition of the internal combustion engine, an idle condition of the internal combustion engine, and a shut-down condition of the internal combustion engine.

36. The system of claim 29, wherein the electronic controller is configured to:
update the one or more corresponding reference signatures of the flywheel and the damper for nominal wear; and select the one or more corresponding reference signatures based on an application for which the engine system is to be used.

37. The method of claim 22, further comprising updating, with the system, the selected reference signature of the flywheel and the damper based on an application in which the internal combustion engine is to be used, wherein the updating further includes adjusting the selected reference signature for nominal wear.

38. The method of claim 19, further comprising updating, with the controller the selected reference signature of the flywheel and the damper based on an application in which the internal combustion engine is to be used, wherein the updating further includes adjusting the selected reference signature for nominal wear.

39. The system of claim 12, wherein the application of the engine system is selected from the group consisting of an automotive application, an agriculture application, a construction application, an industrial application, an oil and gas application, a power unit application, a mining application, a marine application, an aviation application, and a power generation application.

* * * * *